United States Patent
Miller et al.

(10) Patent No.: US 12,211,025 B2
(45) Date of Patent: *Jan. 28, 2025

(54) METHOD OF APPLYING FOR CREDIT AT A SELF-CHECKOUT

(71) Applicant: Synchrony Bank, Stamford, CT (US)

(72) Inventors: Jake Miller, Stamford, CT (US); Joseph Nelly, Stamford, CT (US); Jared King, Stamford, CT (US); Kaeli Stichler, Stamford, CT (US); Shawn Dole, Stamford, CT (US); Timothy Christensen, Stamford, CT (US); Jennifer Muller, Stamford, CT (US); Taylor Young, Stamford, CT (US); Seamus Sullivan, Stamford, CT (US); Prakash Kothandapani, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,514

(22) Filed: Mar. 13, 2023

(65) Prior Publication Data

US 2023/0351357 A1 Nov. 2, 2023

Related U.S. Application Data

(63) Continuation of application No. 16/263,565, filed on Jan. 31, 2019, now Pat. No. 11,625,704.

(51) Int. Cl.
*G06Q 20/20* (2012.01)
*G06Q 20/16* (2012.01)
(Continued)

(52) U.S. Cl.
CPC ........... *G06Q 20/204* (2013.01); *G06Q 20/16* (2013.01); *G06Q 20/24* (2013.01); *G06Q 20/3274* (2013.01); *G06Q 40/03* (2023.01)

(58) Field of Classification Search
CPC ...... G06Q 20/204; G06Q 40/03; G06Q 20/16; G06Q 20/24; G06Q 20/3274
See application file for complete search history.

(56) References Cited

U.S. PATENT DOCUMENTS

| 11,625,704 B2* | 4/2023 | Miller ................ G06Q 20/3274 705/17 |
| 2009/0099914 A1 | 4/2009 | Lang |

(Continued)

OTHER PUBLICATIONS

A.C. Weaver, "Secure Sockets Layer" in Computer, vol. 39, No. 4., pp. 88-90, Apr. 2006, doi:10.1109/MC.2006.138 (Year: 2006).*
(Continued)

*Primary Examiner* — Paul Danneman
(74) *Attorney, Agent, or Firm* — Polsinelli LLP

(57) ABSTRACT

A method performed by at least one computing device. The method includes receiving a credit request from a self-checkout device before a customer completes an instore checkout process and sending a request for a Uniform Resource Locator ("URL") to one or more authentication computing devices. The authentication computing device(s) send the URL to the mobile device. The method includes sending a credit application to the mobile device after the customer selects the URL, receiving a submission of the credit application from the mobile device, approving credit based on the submission, and forwarding a code to the mobile device. The code indicates that the credit is to be used to complete the instore checkout process when scanned by the scanner.

21 Claims, 12 Drawing Sheets

(51) Int. Cl.
*G06Q 20/24* (2012.01)
*G06Q 20/32* (2012.01)
*G06Q 40/03* (2023.01)

(56) References Cited

U.S. PATENT DOCUMENTS

| | | | |
|---|---|---|---|
| 2010/0306072 A1* | 12/2010 | Ford, Jr. | G06Q 20/202 |
| | | | 705/38 |
| 2011/0153437 A1 | 6/2011 | Archer | |
| 2012/0041870 A1 | 2/2012 | Baskerville | |
| 2013/0218693 A1* | 8/2013 | Zito | G06Q 20/204 |
| | | | 705/16 |
| 2015/0073975 A1 | 3/2015 | Bornhoffen | |
| 2016/0012465 A1 | 1/2016 | Sharp | |
| 2020/0104834 A1 | 4/2020 | Pontious | |
| 2020/0118205 A1 | 4/2020 | Bloy | |

OTHER PUBLICATIONS

Mehta, Bhakti, downloaded via 222.it-ebooks.info, 134 pages (Year: 2014).*
Office Action mailed Aug. 3, 2020 in U.S. Appl. No. 16/263,565.
Office Action mailed Oct. 19, 2020 in U.S. Appl. No. 16/263,565.
Office Action mailed Apr. 19, 2021 in U.S. Appl. No. 16/263,565.
Office Action mailed Aug. 10, 2022 in U.S. Appl. No. 16/263,565.
Notice of Allowance mailed Dec. 12, 2022 in U.S. Appl. No. 16/263,565.

* cited by examiner

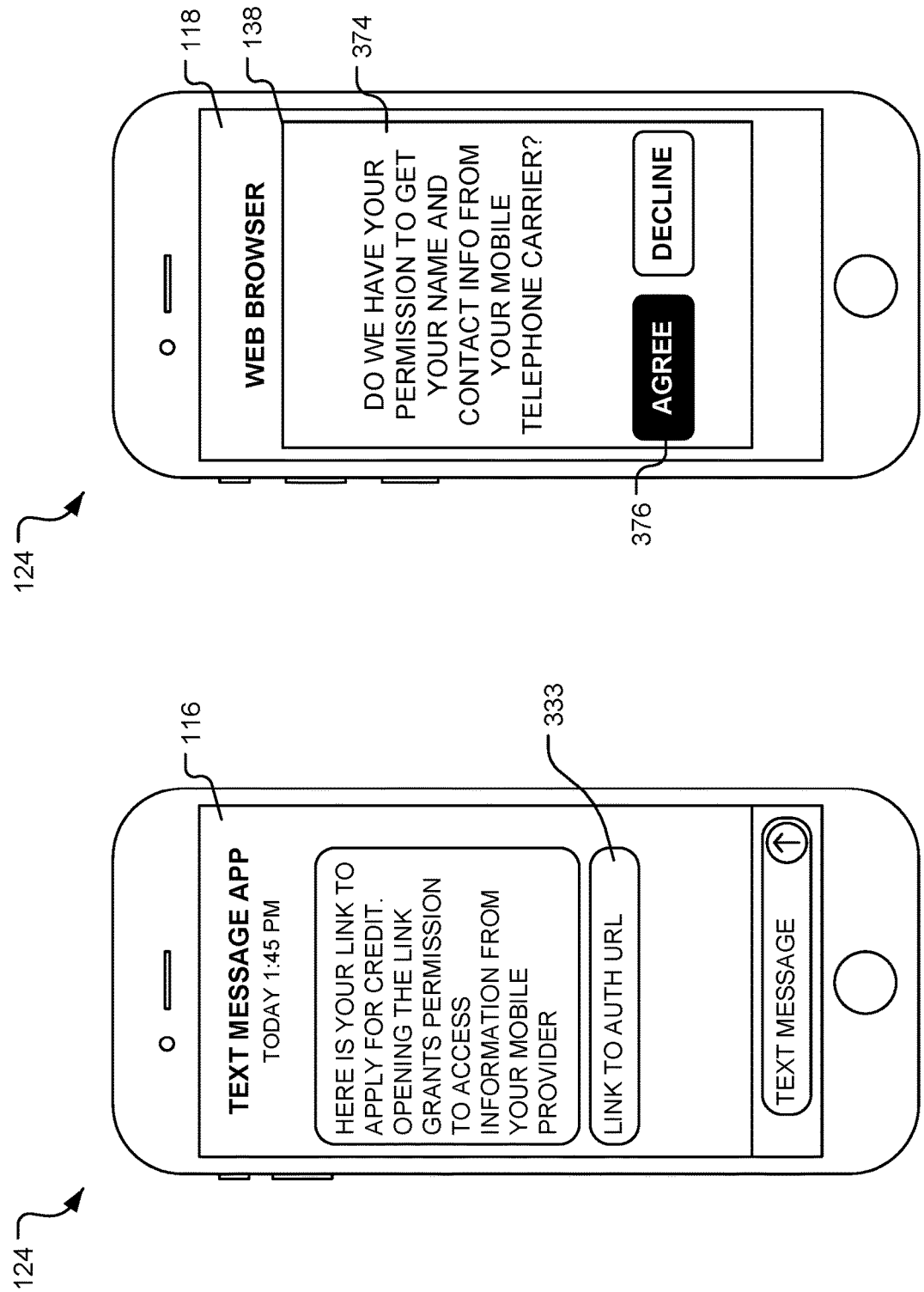

METHOD OF APPLYING FOR CREDIT AT A SELF-CHECKOUT

CROSS REFERENCE TO RELATED APPLICATIONS

The present Application is a continuation of U.S. patent application Ser. No. 16/263,565 filed on Jan. 31, 2019, which is incorporated herein by reference in its entirety.

BACKGROUND OF THE INVENTION

Field of the Invention

The present invention is directed generally towards methods performed by a self-checkout unit.

Description of the Related Art

Retailers are moving away from traditional cashier staffed registers. Instead, self-checkout units are becoming a primary way in which customers scan, pay, and bag their purchases. Unfortunately, unlike at traditional registers, there is no way for retailers to offer credit or accept credit applications at these self-checkout units.

BRIEF DESCRIPTION OF THE DRAWINGS

FIG. 8 illustrates an exemplary screen displayed by a text application implemented by a mobile device of FIG. 1.

FIG. 9 illustrates an exemplary first screen displayed by a web browser implemented by the mobile device of FIG. 1.

Like reference numerals have been used in the figures to identify like components.

DETAILED DESCRIPTION OF THE INVENTION

Figure 1:
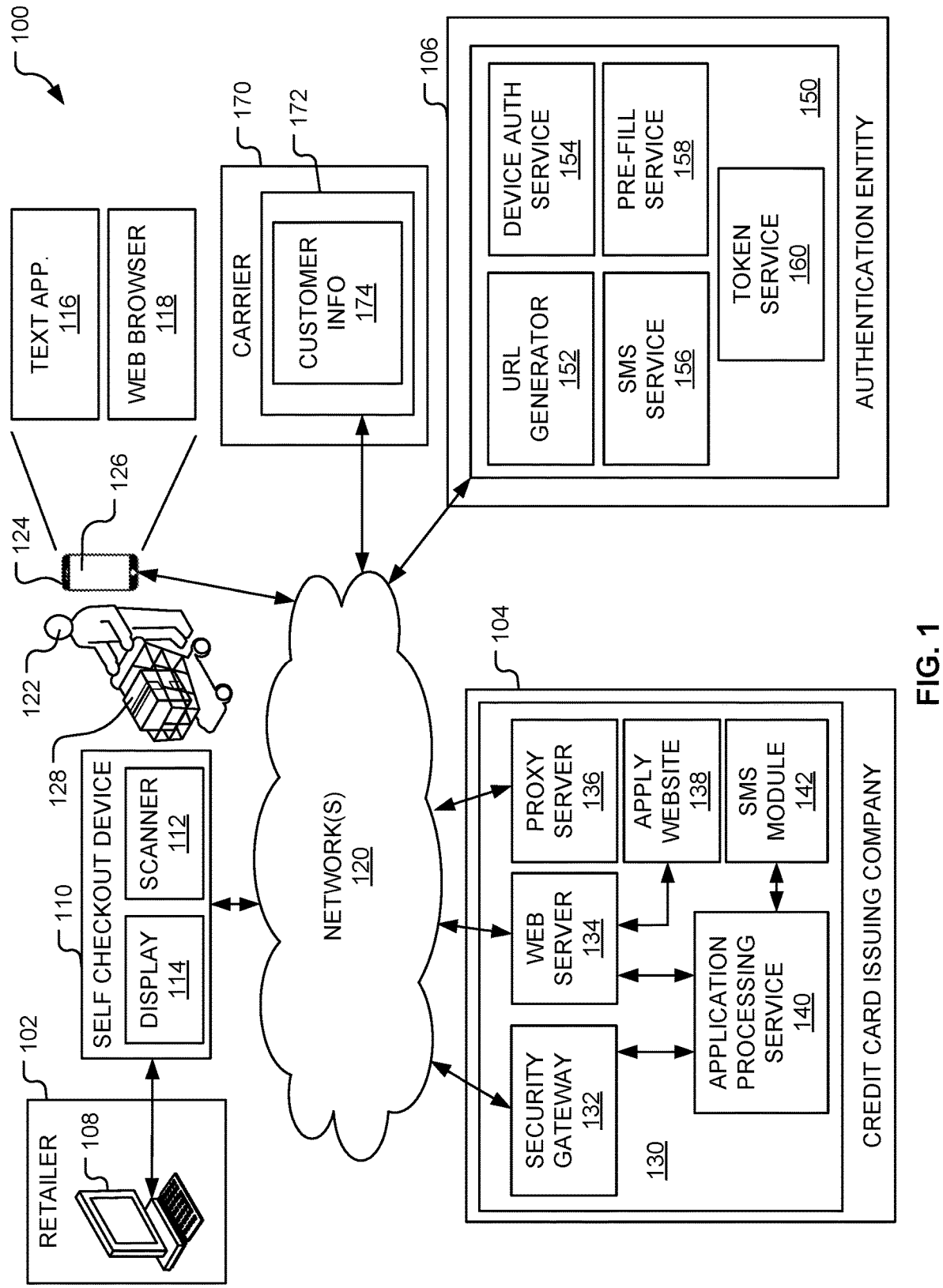
FIG. 1 is a diagram of a system that includes computing devices and is configured to allow customers to apply for credit at a self-checkout register or device.

FIG. 1 is a block diagram of a system 100 operated at least in part by a retailer 102, a credit card issuing company 104, and an authentication entity 106. The retailer 102 includes a retail computing system 108 connected to at least one Self-Checkout (SCO) register or device 110. The SCO device 110 includes a scanner 112 (e.g., a barcode scanner) and a display device 114. The retail computing system 108 may be directly connected or connected by one or more networks 120 (described below) to the SCO device 110. The retail computing system 108 and the SCO device 110 may each be implemented by one or more computing devices, which may each be implemented as a computing device 12 described below and illustrated in FIG. 14.

Referring to FIG. 1, the SCO device 110 is configured to be operated by a customer 122 having a mobile device 124 (e.g., a cellular telephone) with a display device 126 (e.g., a conventional touch screen). For example, the customer 122 may purchase one or more items 128 using the SCO device 110. As will be described below, the customer 122 may also use the SCO device 110 and the mobile device 124 to apply for credit. Enabling the customer 122 to request credit at the SCO device 110 and complete the application process using the mobile device 124 gives the customer 122 the opportunity to save money by applying for credit when it is needed in a quick and easy manner. The mobile device 124 implements a text application 116 and a web browser 118. By way of non-limiting examples, the mobile device 124 may be implemented as a mobile communication device 600 described below and illustrated in FIG. 15 or as a computing device 12 described below and illustrated in FIG. 14.

Referring to FIG. 1, mobile services are provided to the mobile device 124 by a mobile service provider or carrier 170. The carrier 170 operates one or more computing devices 172 configured to communicate over the network(s) 120. The computing device(s) 172 store customer information 174 about the customer 122. By way of a non-limiting example, the customer information 174 may include one or more of the following:
1. Mobile telephone number;
2. First Name;
3. Last Name;
4. Address;
5. Extended Address;
6. City;
7. Region;
8. Postal Code;
9. Email Address; and
10. Status.

The computing device(s) 172 may each be implemented as the computing device 12 described below and illustrated in FIG. 14.

Referring to FIG. 1, the credit card issuing company 104 operates one or more computing devices 130. The computing device(s) 130 implement a security gateway 132, a web server 134, a proxy server 136, an application processing service 140, and a Short Message Service ("SMS") module 142. The security gateway 132 is configured to communicate with the SCO device 110 over the network(s) 120. By way of a non-limiting example, the security gateway 132 may be implemented as a Forum Sentry API Security Gateway provided by Forum Systems. The web server 134 and the proxy server 136 are both connected to the network(s) 120. The web server 134 is configured to generate an apply website 138. The application processing service 140 is configured to communicate with the security gateway 132 and/or the web server 134. The Short Message Service ("SMS") module 142 is configured to communicate with the application processing service 140. The SMS module 142 may be implemented by middleware. By way of a non-limiting example, the computing device(s) 130 may each be implemented as the computing device 12 described below and illustrated in FIG. 14.

The authentication entity 106 operates one or more authentication computing devices 150 configured to communicate over the network(s) 120. The authentication computing device(s) 150 may implement a Uniform Resource Locator ("URL") generator 152, a device authentication service 154, an SMS service 156, a pre-fill service 158, and/or a token service 160. By way of a non-limiting example, the authentication computing device(s) 150 may each be implemented as the computing device 12 described below and illustrated in FIG. 14.

Figure 2:
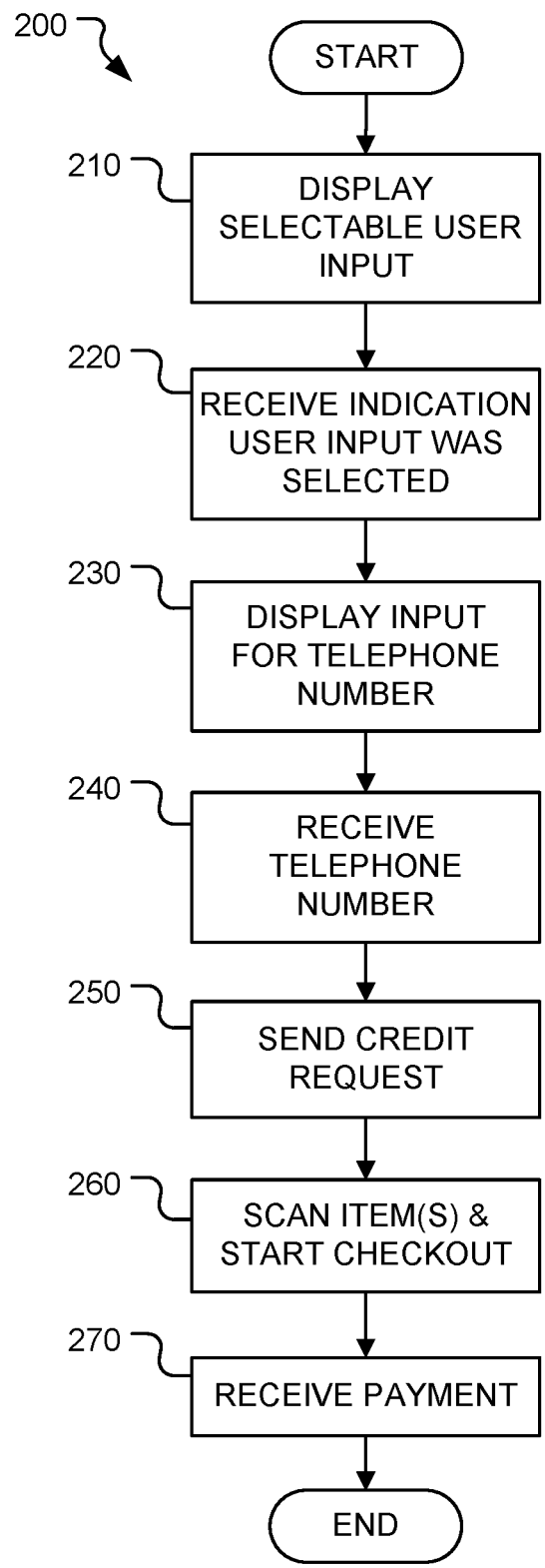
FIG. 2 is a flow diagram of a method performed by the self-checkout device of FIG. 1.
Figure 3:
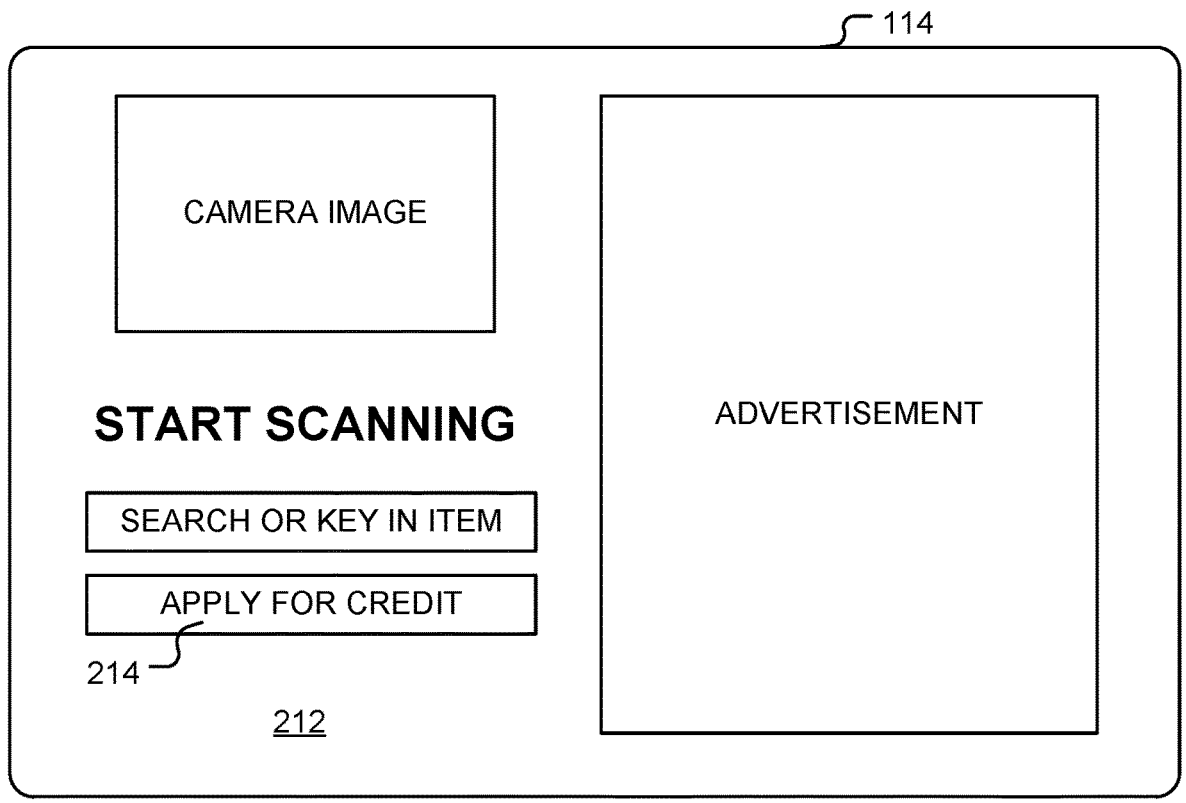
FIG. 3 illustrates an exemplary first screen displayed by a display device of the self-checkout device of FIG. 1.

FIG. 2 is a flow diagram of a method 200 performed by the SCO device 110 (see FIG. 1). As mentioned above, the SCO device 110 (see FIG. 1) includes the display device 114 (see FIGS. 1 and 3-5) that may be implemented as a convention touch screen. Referring to FIG. 3, in first block 210 (see FIG. 2), the display device 114 of the SCO device 110 (see FIG. 1) displays a screen 212 to the customer 122 (see FIG. 1) including a selectable user input 214. By selecting (e.g., tapping on) the user input 214, the customer 122 (see FIG. 1) starts a credit application process. Referring to FIG. 1, in next block 220 (see FIG. 2), the SCO device 110 receives an indication that the customer 122 has selected the user input 214 (see FIG. 3).

Figure 4:
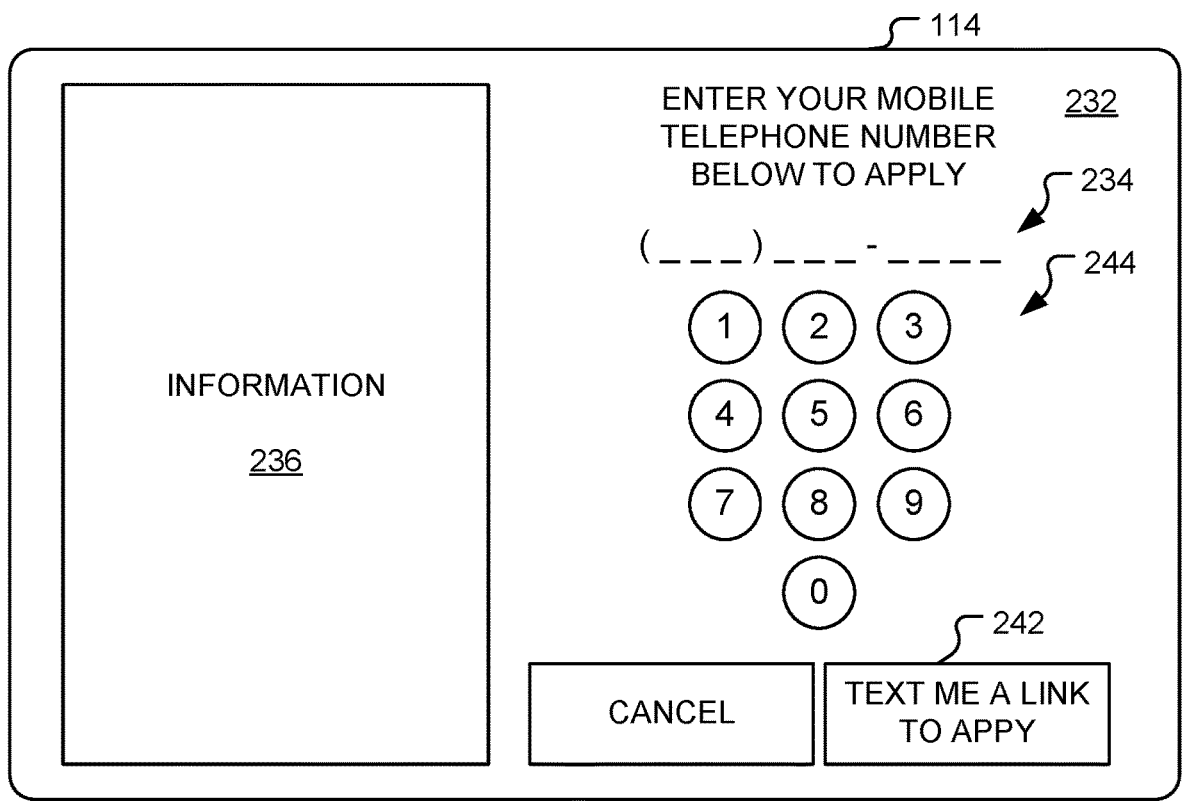
FIG. 4 illustrates an exemplary second screen displayed by the display device of the self-checkout device of FIG. 1.

Referring to FIG. 4, in block 230 (see FIG. 2), the display device 114 of the SCO device 110 (see FIG. 1) displays a screen 232 including one or more inputs 234 for a telephone number associated with the mobile device 124 (see FIGS. 1, 6, and 8-12). The screen 232 may also include information 236 regarding a credit card product being offered. Referring to FIG. 2, in block 240, the SCO device 110 receives the telephone number input by the customer 122 (see FIG. 1) into the input(s) 234 (see FIG. 4). For example, in block 240, the customer 122 (see FIG. 1) may enter the telephone number into the input(s) 234 (see FIG. 4) and click or tap on a selectable user input 242 (e.g., a button). As shown in FIG. 4, the input(s) 234 may include numerical input buttons 244.

Figure 5:
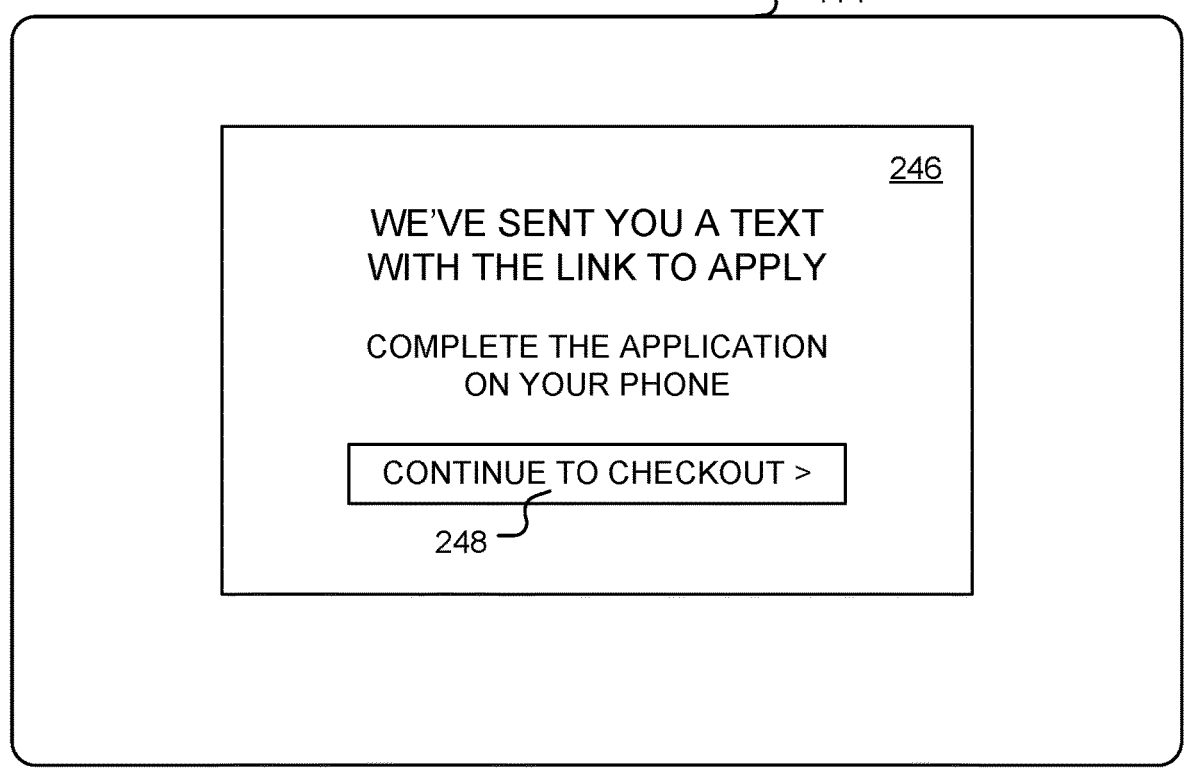
FIG. 5 illustrates a confirmation window displayed by the display device of the self-checkout device of FIG. 1.

Optionally, after the SCO device 110 receives the telephone number, the display device 114 may display a confirmation message or window 246 (see FIG. 5). Referring to FIG. 5, the confirmation window 246 may inform the customer 122 (see FIG. 1) that a text message is being sent to the telephone number received in block 240 (see FIG. 2). The confirmation window 246 may include a selectable user input 248 that when selected by the customer 122 (see FIG. 1) allows the customer 122 to use the scanner 112 (see FIG. 1) to begin scanning the item(s) 128 (see FIG. 1) to be purchased at the SCO device 110 (see FIG. 1).

Figure 6:
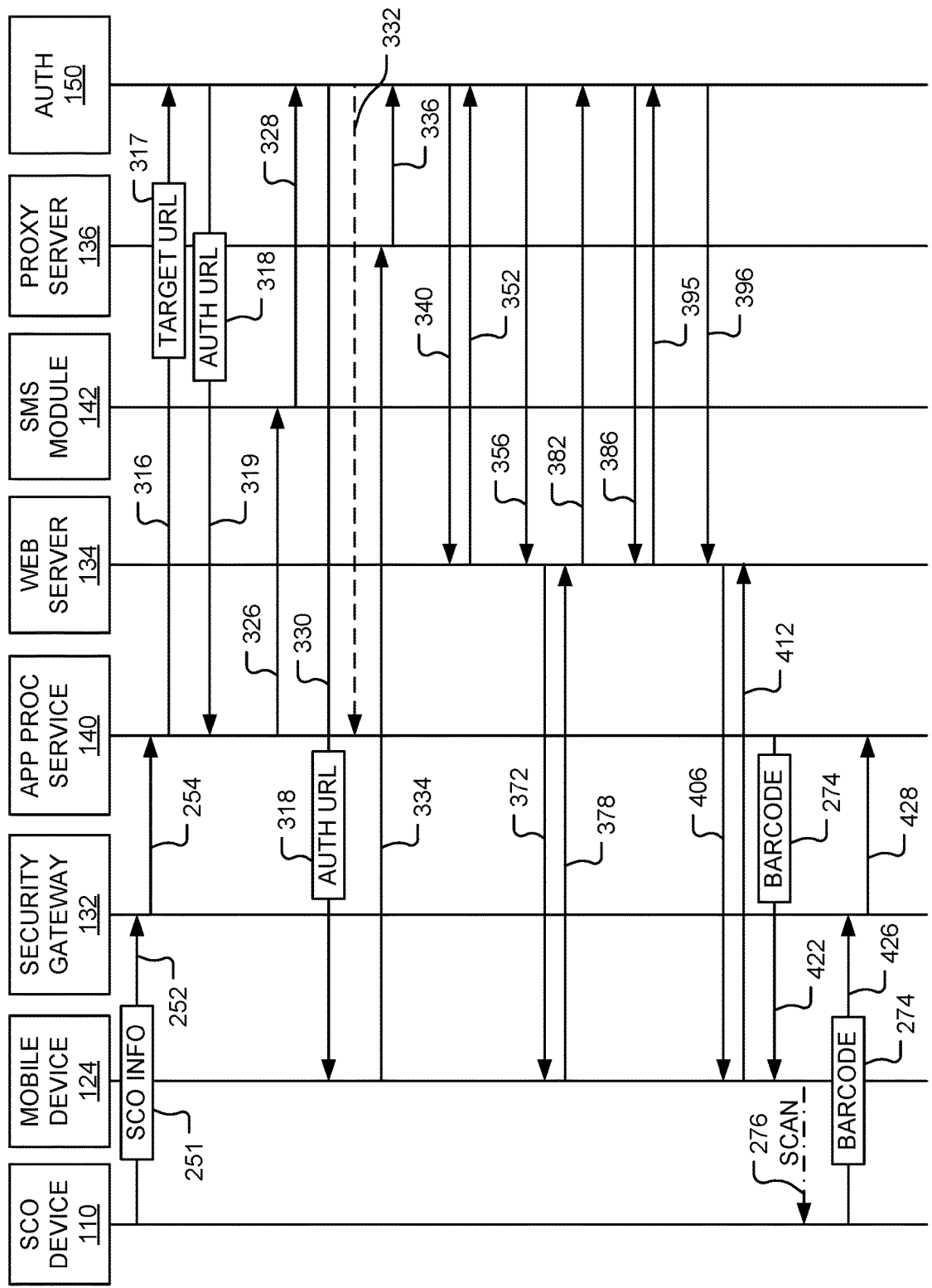
FIG. 6 illustrates exemplary interactions between the computing devices of FIG. 1.

Referring to FIG. 2, in block 250, the SCO device 110 (see FIG. 1) sends a credit request 252 (see FIG. 6) including SCO information 251 (see FIG. 6) to the application processing service 140 (see FIGS. 1 and 6). Referring to FIG. 6, in the embodiment illustrated, the credit request 252 is sent by the SCO device 110 to the security gateway 132, which forwards the credit request 252, as a credit request 254, to the application processing service 140. The credit request 252 may be implemented as a JSON packet. The security gateway 132 may be an exposed RESTful endpoint configured to receive the credit request 252 (e.g., a JSON packet). The SCO device 110 may access the exposed RESTful endpoint using a URL. In other words, the SCO device 110 may send the credit request 252 (e.g., a JSON packet) to the URL associated with the security gateway 132. The SCO information 251 may include one or more of the following:

a. Retailer Identifier ("ID");
    b. Country code;
    c. Store Number;
    d. Timestamp;
    e. Register Number;
    f. Client ID; and
    g. Mobile Telephone Number;

Referring to FIG. 1, after the SCO device 110 sends the credit request 252 (see FIG. 6), the SCO device 110 waits for the customer 122 to use the scanner 112 to scan the item(s) 128.

In block 260 (see FIG. 2), the customer 122 uses the scanner 112 to scan the item(s) 128 and initiates checkout on the SCO device 110. Thus, in block 260 (see FIG. 2), the SCO device 110 receives identifications of the item(s) 128, looks up an associated price for each of the item(s) 128, and determines a total transaction price. By way of a non-limiting example, the SCO device 110 may look up the prices using the retail computing system 108.

Figure 12:
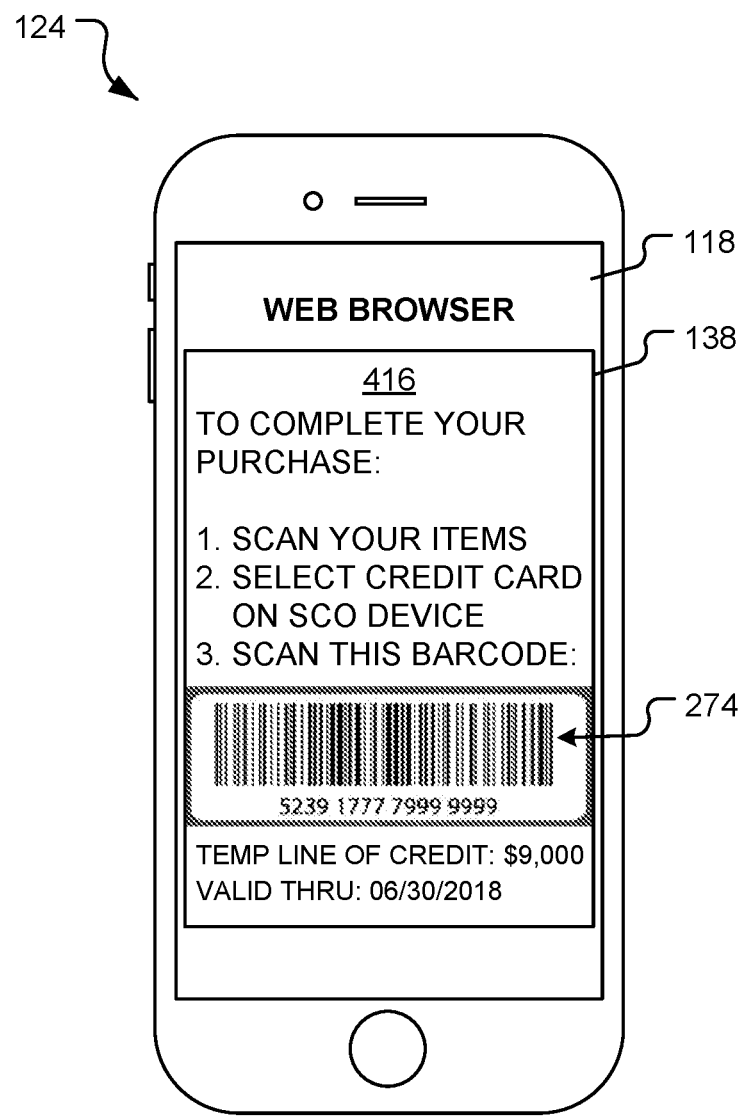
FIG. 12 illustrates an exemplary approval screen displayed by the web browser implemented by the mobile device of FIG. 1.

In block 270 (see FIG. 2), the SCO device 110 receives payment for the item(s) 128. If the customer 122 was not successful at obtaining credit, in block 270 (see FIG. 2), the SCO device 110 receives a standard form of payment from the customer 122, such as cash, a check, a credit card, or other form of payment. On the other hand, if the customer 122 successfully obtained the credit, the SCO device 110 receives a code, which the customer 122 scanned from the display device 126 of the mobile device 124 using the scanner 112. Referring to FIG. 12, in the embodiment illustrated, the code has been implemented as a payment barcode 274. However, the code may be implemented as another type of dynamically generated and/or encrypted value or image. By way of a non-limiting example, the code may include encrypted payment information.

Referring to FIG. 6, an arrow 276 represents the customer 122 (see FIG. 1) scanning the payment barcode 274 using the scanner 112 (see FIG. 1). The SCO device 110 forwards the payment barcode 274 to the application processing service 140 via the security gateway 132. The application processing service 140 uses credit associated with the payment barcode 274 to complete the purchase. Thus, at this point, the customer 122 (see FIG. 1) successfully completed the credit application process and used that credit to purchase the item(s) 128 (see FIG. 1).

Referring to FIG. 2, the method 200 terminates after the block 270.

Figure 7:
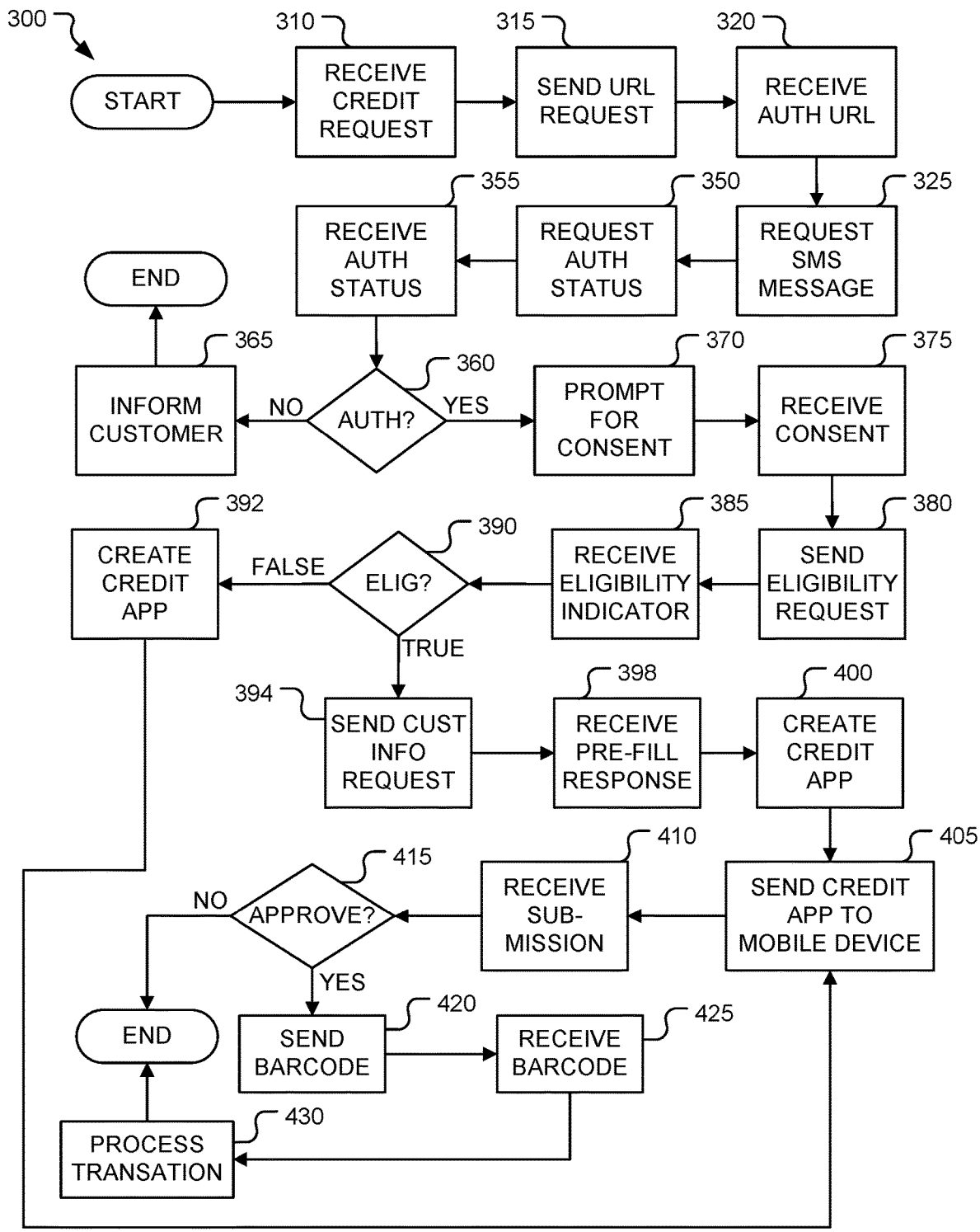
FIG. 7 is a flow diagram of a method performed by an application processing service implemented by one or more of the computing devices operated by a credit card issuing company.

FIG. 7 is a flow diagram of a method 300 performed by the application processing service 140. In first block 310, referring to FIG. 6, the application processing service 140 receives the credit request 254 (e.g., a JSON packet) from the SCO device 110. As mentioned above, the SCO device 110 may send the credit request 252 to the security gateway 132, which forwards the credit request 254 to the application processing service 140.

In block 315 (see FIG. 7), the application processing service 140 sends a URL request 316 for an authentication URL 318 to the URL generator 152 (see FIG. 1) implemented by the authentication computing device(s) 150. The URL request 316 may include a target URL 317 and the SCO information (e.g., appended to the target URL as variables). The target URL 317 may be URL of the apply website 138 (see FIGS. 1 and 9-12) operated by the web server 134. By way of a non-limiting example, in block 315 (see FIG. 7), the URL generator 152 (see FIG. 1) may be implemented as Payfone and the application processing service 140 may call Payfone and use an application programming interface ("API"), such as /getAuthUrl, to request the authentication URL 318. The URL generator 152 (see FIG. 1) generates the authentication URL 318 and sends it in a message 319 to the application processing service 140.

In block 320 (see FIG. 7), the application processing service 140 receives the message 319 with the authentication URL 318 from the URL generator 152 (see FIG. 1) in response to the URL request 316. In addition to the authentication URL 318, the application processing service 140 may also receive a description, a request ID, an operator name, and a status.

Next, in block 325 (see FIG. 7), the application processing service 140 sends an SMS request to the SMS service 156 (see FIG. 1) implemented by the authentication computing device(s) 150. In the embodiment illustrated, the application processing service 140 sends a create SMS request 326 to the SMS module 142, which creates and sends an SMS request 328 to the SMS service 156 (see FIG. 1). The create SMS request 326 may include a message, the authentication URL 318, and the mobile telephone number. By way of a non-limiting example, the message may be "Here is your link to apply for credit. Opening the link grants permission to access information from your mobile provider." The SMS module 142 generates a request ID and creates the SMS request 328, which may include the request ID, the mobile telephone number, the message, a version, and an authorization (e.g., "accept: application/j son"). Then, the SMS module 142 sends the SMS request 328 to the SMS service 156 (see FIG. 1).

In response to the SMS request 328, the SMS service 156 (see FIG. 1) implemented by the authentication computing device(s) 150 creates and sends an SMS message 330 to the mobile device 124. The SMS message 330 may be sent by the SMS service 156 (see FIG. 1) via a third party (e.g., using an API provided by Twilio, Inc.). Optionally, the SMS service 156 (see FIG. 1) may send a response 332 (e.g., including a status and a description) to the application processing service 140. The SMS message 330 includes the authentication URL 318. Thus, the customer 122 receives the authentication URL 318 from the application processing service 140 (via the SMS service 156). The SMS service 156 (see FIG. 1) may be implemented as an internal SMS service of the authentication computing device(s) 150.

After the mobile device 124 receives the authentication URL 318, the mobile device 124 displays a selectable visual representation 333 (see FIG. 8) of the authentication URL 318. The customer 122 may use the authentication URL 318 to visit a web address (e.g., by touching or tapping on the visual representation 333 of the authentication URL 318). The authentication URL 318 may route (represented by an arrow 334) the mobile device 124 to the proxy server 136, which may redirect (represented by an arrow 336) the mobile device 124 to the device authentication service 154 (see FIG. 1) implemented by the authentication computing device(s) 150. The device authentication service 154 (see FIG. 1) authenticates the mobile device 124 and routes (illustrated as arrow 340) the mobile device 124 using the target URL 317 to the apply website 138 (see FIGS. 1 and 9-12) operated by the web server 134. As mentioned above, the target URL 317 was included in the URL request 316. A verification fingerprint may be appended to end of the target URL 317. The apply website 138 (see FIGS. 1 and 9-12) obtains the SCO information and the verification fingerprint appended to the target URL 317.

In block 350 (see FIG. 7), the apply website 138 (see FIGS. 1 and 9-12) sends a request 352 for authentication status to the device authentication service 154 (see FIG. 1) implemented by the authentication computing device(s) 150. By way of a non-limiting example, if the device authentication service 154 (see FIG. 1) is Payfone, the apply website 138 (see FIGS. 1 and 9-12) may use an API "/getAuthPath" to request and receive the authentication status from the device authentication service 154 (see FIG. 1). The request 352 may include the verification fingerprint, a request ID generated by the apply website 138 (see FIGS. 1 and 9-12), and an API Client ID provided by the device authentication service 154 (see FIG. 1). The authentication status indicates whether the customer 122 was successfully authenticated or was denied authentication.

In block 355 (see FIG. 7), the apply website 138 (see FIGS. 1 and 9-12) receives the authentication status 356 from the device authentication service 154 (see FIG. 1). The authentication status 356 may include a description, a Request ID, a transaction ID, an authorization signature, an authorization code, an expiration time, a path field, and a status. The path field may include the authentication status 356. By way of a non-limiting example, the path may include a green value, a yellow value, and a red value.

In decision block 360 (see FIG. 7), the apply website 138 (see FIGS. 1 and 9-12) decides which action to take based on the authentication status 356. When the authentication status 356 indicates that the customer 122 was not successfully authenticated (e.g., the path field stores the red value), in block 365 (see FIG. 7), the apply website 138 (see FIGS. 1 and 9-12) sends an instruction to the mobile device 124 to display a message informing the customer 122 that they were not authenticated. Then, the method 300 terminates.

On the other hand, when the authentication status indicates that the customer 122 was successfully authenticated (e.g., the path field stores the green or yellow values), in block 370 (see FIG. 7), the apply website 138 (see FIGS. 1 and 9-12) sends an instruction 372 to the mobile device 124 to prompt the customer 122 to consent to the apply website 138 acquiring the customer information 174 (see FIG. 1) from the carrier 170 (see FIG. 1). For example, in block 370 (see FIG. 7), the instruction 372 may instruct the mobile device 124 to display a dialog box or screen 374 (see FIG. 9) requesting consent. Referring to FIG. 9, the screen 374 may display a selectable user input 376 that when selected indicates the customer 122 consents.

Referring to FIG. 6, in block 375 (see FIG. 7), the apply website 138 (see FIGS. 1 and 9-12) operated by the web server 134 receives an indication 378 that the customer 122 consents.

In block 380 (see FIG. 7), the apply website 138 (see FIGS. 1 and 9-12) sends an eligibility request 382 to the device authentication service 154 (see FIG. 1) implemented by the authentication computing device(s) 150. By way of a non-limiting example, if the device authentication service 154 (see FIG. 1) is Payfone, the apply website 138 (see FIGS. 1 and 9-12) may use an API "/eligibility" to request and receive eligibility from the device authentication service 154 (see FIG. 1). The eligibility request 382 may include the mobile telephone number, a version, an access token, an accept field, a request ID generated by the apply website 138 (see FIGS. 1 and 9-12), and a minimum trust score. The minimum trust score may be determined based on the path field. For example, the minimum trust score may be assigned a first value (e.g., 300) when the path field stores the green value and a second value (e.g., 500) when the path field stores the yellow value. The second value may be larger than the first value. The apply website 138 (see FIGS. 1 and 9-12) may use the token service 160 (see FIG. 1) implemented by the authentication computing device(s) 150 to obtain the access token.

In block 385 (see FIG. 7), the apply website 138 (see FIGS. 1 and 9-12) receives a response 386 to the eligibility request 382 from the device authentication service 154 (see FIG. 1) implemented by the authentication computing device(s) 150. The response 386 may include a description, a request ID, a Transaction ID, the mobile telephone number, a line type, a carrier, a country code, an eligibility indicator, and a status. By way of a non-limiting example, the eligibility indicator may be implemented as Boolean. Thus, the eligibility indicator may be either "TRUE" or "FALSE."

In decision block 390 (see FIG. 7), the apply website 138 (see FIGS. 1 and 9-12) decides which action to take based on the eligibility indicator. When the eligibility indicator is "FALSE," in block 392 (see FIG. 7), the apply website 138 (see FIGS. 1 and 9-12) creates an electronic credit application 432 (see FIG. 11). On the other hand, when the eligibility indicator is "TRUE," in block 394 (see FIG. 7), the apply website 138 (see FIGS. 1 and 9-12) sends a customer information request 395 to the device authentication service 154 (see FIG. 1). By way of a non-limiting example, if the device authentication service 154 (see FIG. 1) is Payfone, the apply website 138 (see FIGS. 1 and 9-12) may use an API "/identity" to request and receive customer information from the device authentication service 154. The customer information request may include the mobile telephone number, a version, the access token, accept (e.g., "application/j son"), a request ID, a consent status, a consent timestamp, a consent grant ID, and a consent description.

Referring to FIG. 1, the pre-fill service 158 may send a request to the carrier 170 for at least some of the customer information 174. When the carrier 170 responds with the customer information 174, the pre-fill service 158 provides the customer information 174 to the device authentication service 154.

Referring to FIG. 6, the device authentication service 154 (see FIG. 1) uses the customer information 174 (see FIG. 1) to create a pre-fill response 396 and sends the pre-fill response 396 to the web server 134 in response to the customer information request 395. In block 398 (see FIG. 7), the apply website 138 (see FIGS. 1 and 9-12) receives the pre-fill response 396. The pre-fill response 396 may include one or more of the following pieces of pre-fill information:
1. Description;
2. Request ID;
3. Transaction ID;
4. Audit Key;
5. Timestamp;
6. Mobile Telephone Number;
7. Line Type;
8. Carrier;
9. Country Code;
10. Individual;
11. First Name;
12. Last Name;
13. Address;
14. Extended Address;
15. City;
16. Region;
17. Postal Code;
18. Email Address; and
19. Status.

Then, in block 400 (see FIG. 7), the apply website 138 (see FIGS. 1 and 9-12) creates the electronic credit application 432 (see FIG. 11) and uses at least a portion of the pre-fill information (illustrated as pre-filled information 434 in FIG. 11) to pre-fill the electronic credit application 432.

Figures 10, 11:
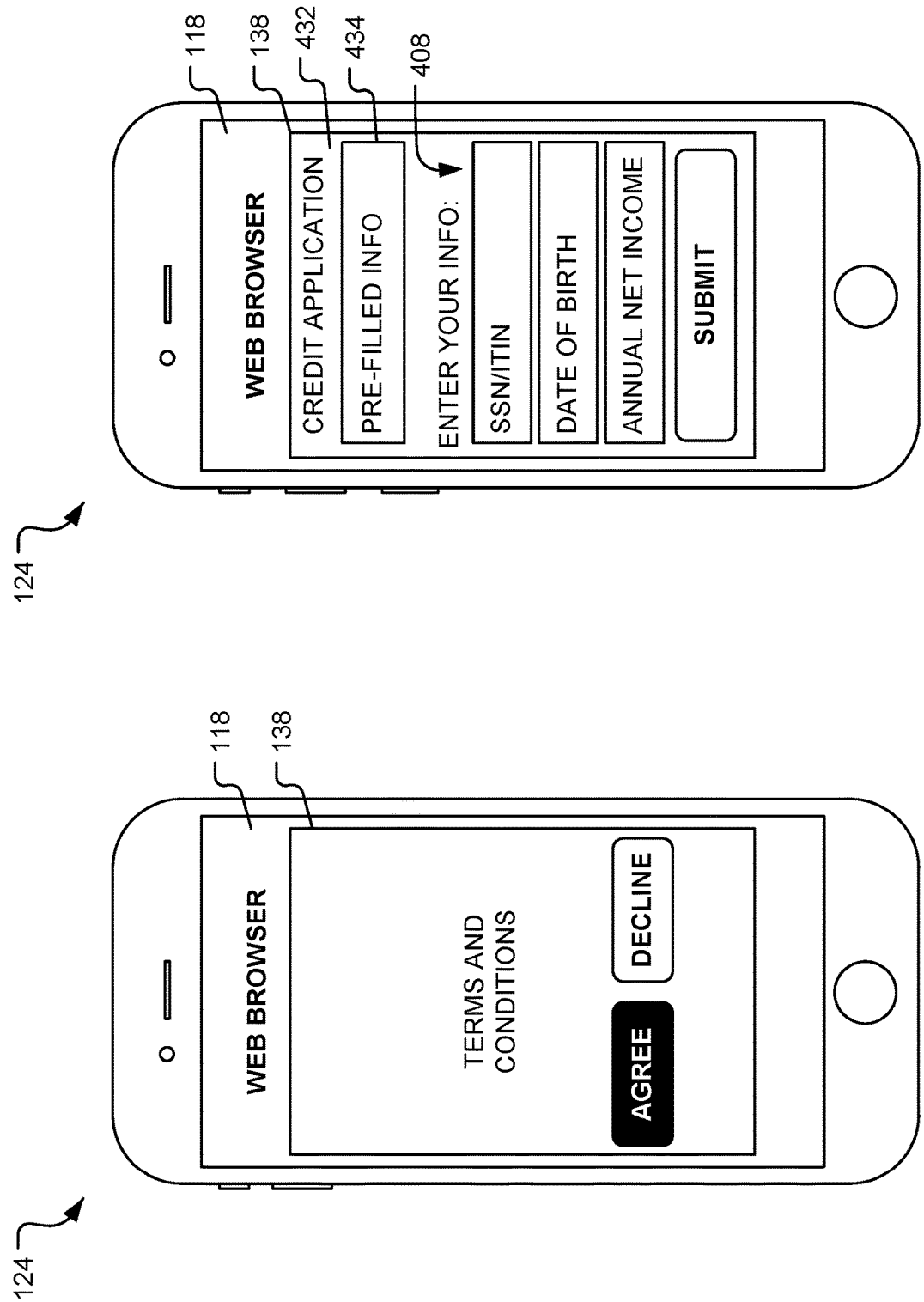
FIG. 10 illustrates an exemplary second screen displayed by the web browser implemented by the mobile device of FIG. 1.
FIG. 11 illustrates an exemplary third screen that requests customer supplied information and is displayed by the web browser implemented by the mobile device of FIG. 1.

In block 405 (see FIG. 7), the apply website 138 (see FIGS. 1 and 9-12) sends an instruction 406 to the mobile device 124 that instructs the mobile device 124 to display the electronic credit application 432 (see FIG. 11) to the customer 122. Referring to FIG. 11, the electronic credit application 432 may require customer supplied information 408 such as one or more of the following:
1. Last four numbers of the social security number ("SSN") of the customer 122;
2. The date of birth of the customer 122; and
3. Annual net income of the customer 122.

Referring to FIG. 6, the apply website 138 (see FIGS. 1 and 9-12) receives a submitted application 412 including the customer supplied information 408 (see FIG. 11) in block 410 (see FIG. 7).

Then, in decision block 415 (see FIG. 7), the application processing service 140 determines whether to approve or deny the submitted application 412.

When the application processing service 140 decides to deny the submitted application 412, the application processing service 140 may instruct the mobile device 124 to display a denial page or screen (not shown). Then, the method 300 terminates.

On the other hand, when the application processing service 140 decides to approve the submitted application 412, in block 420 (see FIG. 7), the application processing service 140 dynamically generates the payment barcode 274 associated with an amount of credit awarded to the customer 122 and sends the payment barcode 274 in a message 422 to the mobile device 124. The message 422 may also instruct the mobile device 124 to display an approval page or screen 416 (see FIG. 12) that includes the payment barcode 274, which contains encrypted payment information.

In block 425 (see FIG. 7), the application processing service 140 receives a payment request from the SCO device 110 including the payment barcode 274 along with transaction information. Referring to FIG. 6, in the embodiment illustrated, a payment request 426 is sent by the SCO device 110 to the security gateway 132, which forwards the payment request 426, as a payment request 428, to the application processing service 140.

In block 430, the application processing service 140 approves and applies the credit to the transaction. Thus, at this point, the application processing service 140 successfully awarded the credit to the customer 122 and applied that credit to the purchase the item(s) 128 (see FIG. 1) at the SCO device 110. Then, the method 300 terminates.

Figure 13:
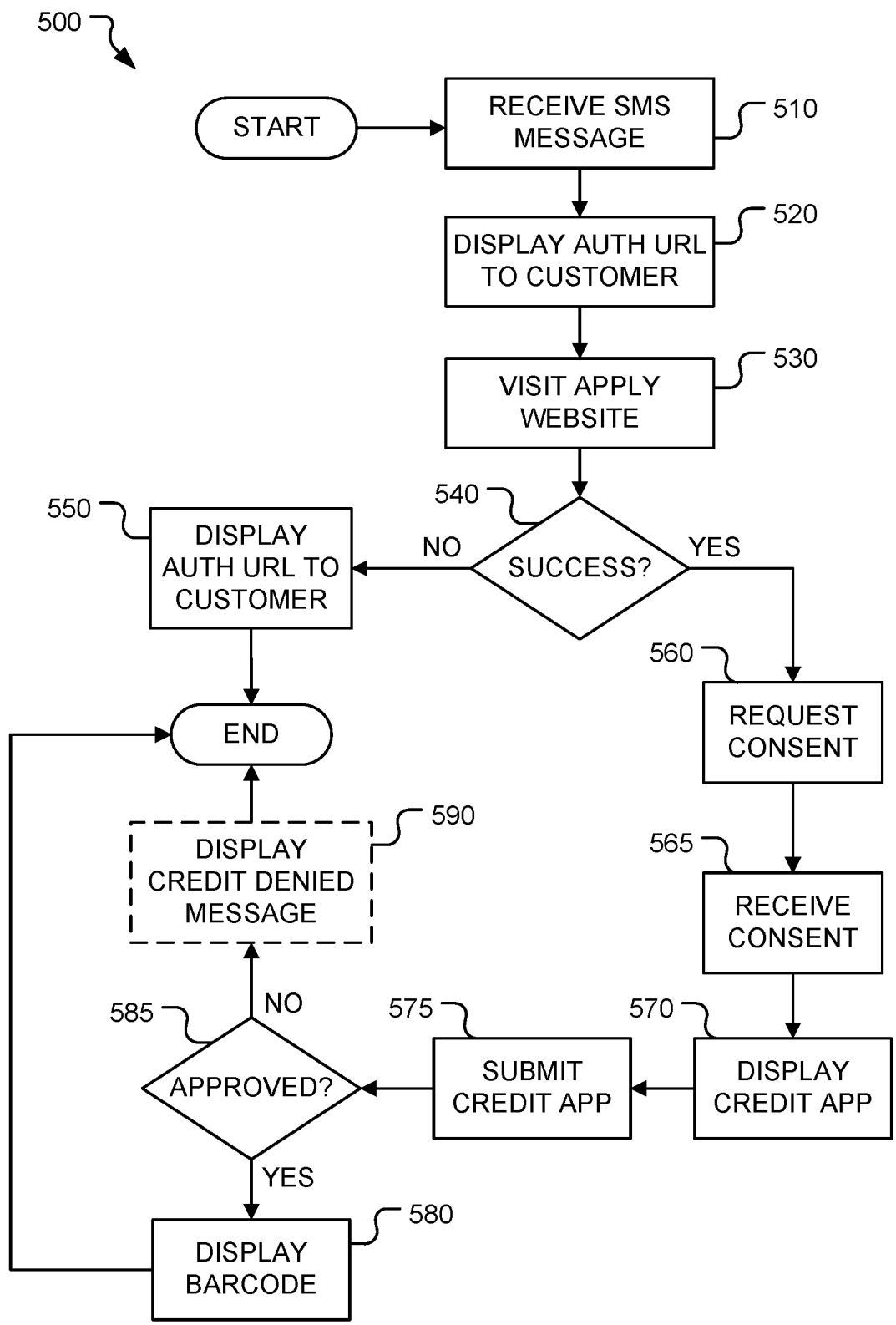
FIG. 13 is a flow diagram of a method performed by the mobile device of FIG. 1.

FIG. 13 is a flow diagram of a method 500 performed by the mobile device 124 (see FIGS. 1, 6, and 8-12). Referring to FIG. 1, by way of a non-limiting example, the method 500 (see FIG. 13) may be performed at least in part by the text application 116 and the web browser 118 both executing on the mobile device 124.

In first block 510 (see FIG. 13), the mobile device 124 receives the SMS message 330 (see FIG. 6) with the authentication URL 318 (see FIG. 6) from the SMS service 156 implemented by the authentication computing device(s) 150. Then, in block 520 (see FIG. 13), the text application 116 displays the visual representation 333 (see FIG. 8) of the authentication URL 318 (see FIG. 6) to the customer 122.

In next block 530 (see FIG. 13), the mobile device 124 visits the apply website 138 using the authentication URL 318 (see FIG. 6). In block 530 (see FIG. 13), the text application 116 receives an indication from the customer 122 that the customer 122 would like to visit the authentication URL 318 (see FIG. 6). For example, referring to FIG. 8, the customer 122 may click on the visual representation 333 (see FIG. 8) of the authentication URL 318 (see FIG. 6), which may cause the text application 116 to launch the web browser 118 and direct the web browser 118 to visit the authentication URL 318. After the device authentication service 154 authenticates the mobile device 124, the apply website 138 receives the authentication status 356 (see FIG. 6) from the device authentication service 154.

Referring to FIG. 13, the decision in decision block 540 is "YES" when the authentication status 356 (see FIG. 6) indicates that the customer 122 (see FIG. 1) was successfully authenticated. Otherwise, the decision in decision block 540 is "NO."

When the decision in decision block 540 is "NO," in block 550, the web browser 118 (see FIGS. 1 and 9-12) displays information indicating that the credit has been denied to the customer 122. Then, the method 500 terminates.

On the other hand, referring to FIG. 9, when the decision in decision block 540 (see FIG. 13) is "YES," the web browser 118 displays the screen 374 in response to the instruction 372 (see FIG. 6) in block 560 (see FIG. 13). As mentioned above, the screen 374 requests consent to the application processing service 140 acquiring information from the carrier 170 (see FIG. 1). The screen 374 may display the selectable user input 376 that when selected indicates the customer 122 consents.

In block 565 (see FIG. 13), the web browser 118 receives the indication that the customer 122 (see FIG. 1) consents and sends the indication 378 (see FIG. 6) to the apply web site 138.

Referring to FIG. 1, in block 570 (see FIG. 13), the mobile device 124 receives the instruction 406 (see FIG. 6) from the apply website 138 to display the credit application 432 (see FIG. 11) and request the customer supplied information 408 (see FIG. 11) from the customer 122. Thus, at this point, by clicking on the visual representation 333 (see FIG. 8) of the authentication URL 318 (see FIG. 6), the customer 122 is both authenticated and has received the credit application 432 (see FIG. 11) including the pre-filled information 434 (see FIG. 11). In block 575 (see FIG. 13), the mobile device 124 submits the credit application 432 (see FIG. 11), which includes the customer supplied information 408 (see FIG. 11), to the apply website 138. Then, the application processing service 140 determines whether to grant the requested credit to the customer 122.

Referring to FIG. 13, the decision in decision block 585 is "YES" when the requested credit has been granted to the customer 122. Otherwise, the decision in decision block 585 is "NC)."

When the decision in decision block 585 is "YES," in block 580, the mobile device 124 (see FIGS. 1, 6, and 8-12) receives the message 422 (see FIG. 6) from the application processing service 140 (see FIGS. 1 and 6) and displays the approval screen 416 (see FIG. 12). Referring to FIG. 12, the approval screen 416 includes the dynamically generated payment barcode 274. Then, the method 500 terminates. At this point, the customer 122 (see FIG. 1) may use the payment barcode 274 to make purchases. Thus, referring to FIG. 1, the customer 122 is able to use the payment barcode 274 (see FIGS. 6 and 12) at the SCO device 110 to shop immediately after approval.

Referring to FIG. 13, when the decision in decision block 585 is "NO," in block 590, the mobile device 124 (see FIGS. 1, 6, and 8-12) may optionally display a message indicating that the credit has been denied. Then, the method 500 terminates.

The methods 200, 300, and 500 (see FIGS. 2, 7, and 13, respectively) allow the customer 122 to quickly apply for and use credit. This is a novel feature because it enables the offering of in-store credit decisioning despite the customer 122 having applied via a digital channel. Additionally, the pre-fill capability reduces the application completion time significantly. The methods 200, 300, and 500 (see FIGS. 2, 7, and 13, respectively) may be triggered from an SCO device (e.g., the SCO device 110) in any in-store location and completed using any Internet enabled device (e.g., the mobile device 124).

Computing Device

Figure 14:
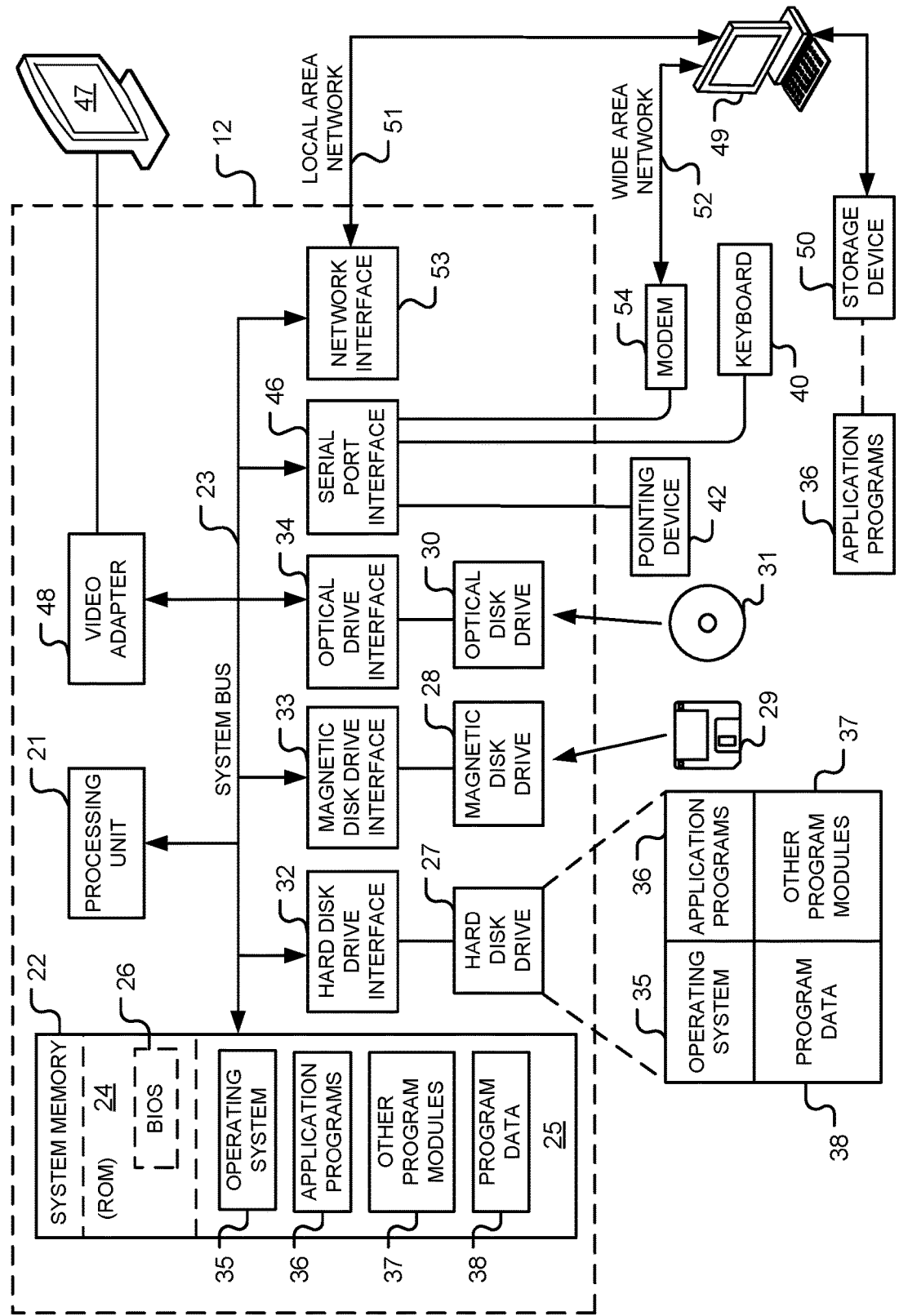
FIG. 14 is a diagram of a hardware environment and an operating environment in which the computing devices of the system of FIG. 1 may be implemented.

FIG. 14 is a diagram of hardware and an operating environment in conjunction with which implementations of the one or more computing devices of the system 100 (see FIG. 1) may be practiced. The description of FIG. 14 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 14 includes a general-purpose computing device in the form of the computing device 12. Each of the computing devices of FIG. 1 (including the devices 108, 110, 130, 124, 150, and 172) may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 14 include a local-area network (LAN) 51 and a wide-area network (WAN) 52. Such networking environments are commonplace in offices, enterprise-wide computer networks, intranets and the Internet. The network(s) 120 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the methods 200, 300, and 500 illustrated in FIGS. 2, 7, and 13, respectively) described above. Such instructions may be stored on one or more non-transitory computer-readable media.

In some embodiments, the system memory 22 stores computer executable instructions that when executed by one or more processors cause the one or more processors to generate the screens illustrated in FIGS. 3-5 and 8-12 and described above. Such instructions may be stored on one or more non-transitory computer-readable media.

Mobile Communication Device

Figure 15:
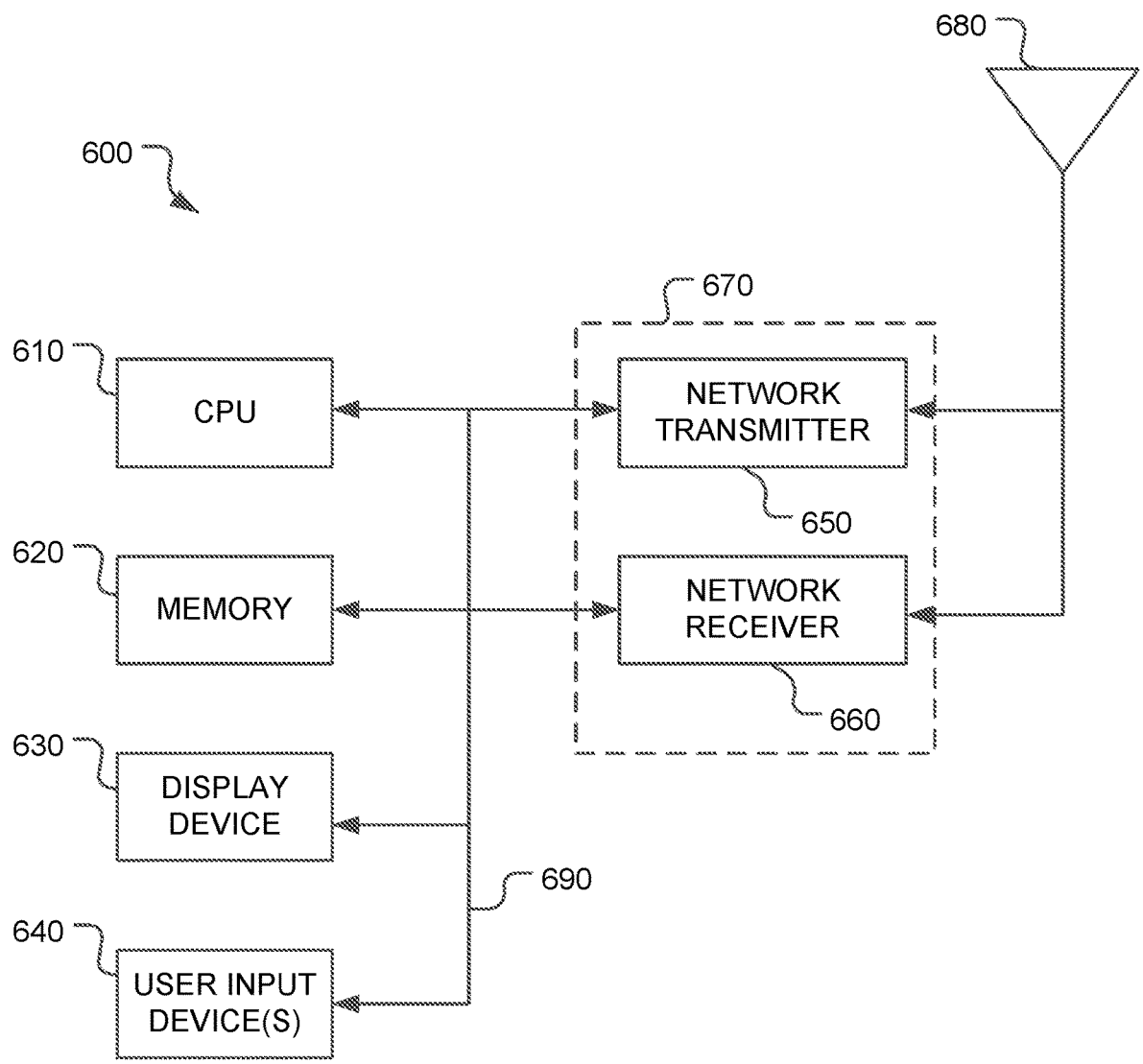
FIG. 15 is a diagram of a hardware environment and an operating environment in which the mobile device of FIG. 1 may be implemented.

FIG. 15 is a functional block diagram illustrating the mobile communication device 600 that may be used to implement the mobile device 124 of FIGS. 1, 6, and 8-12. By way of non-limiting examples, referring to FIG. 15, the mobile communication device 600 may be implemented as a cellular telephone, a tablet computer, and the like. The mobile communication device 600 includes a central processing unit (CPU) 610. Those skilled in the art will appreciate that the CPU 610 may be implemented as a conventional microprocessor, application specific integrated circuit (ASIC), digital signal processor (DSP), programmable gate array (PGA), or the like. The mobile communication device 600 is not limited by the specific form of the CPU 610.

The mobile communication device 600 also contains a memory 620. The memory 620 may store instructions and data to control operation of the CPU 610. The memory 620 may include random access memory, ready-only memory, programmable memory, flash memory, and the like. The mobile communication device 600 is not limited by any specific form of hardware used to implement the memory 620. The memory 620 may also be integrally formed in whole or in part with the CPU 610.

The mobile communication device 600 also includes conventional components, such as the display device 630 and one or more user input devices 640 (e.g., buttons, a keypad, a keyboard, and the like). These are conventional components that operate in a known manner and need not be described in greater detail. The display device 126 may be implemented as the display device 630. The display device 630 may be implemented as a touch display or touchscreen configured to receive user input (e.g., selection of the selectable visual representation 333 (see FIG. 8), selection of the selectable user input 376 (see FIG. 9), entry of the customer supplied information 408 (see FIG. 11), submission of information and/or agreement, and the like). By way of non-limiting examples, the display device 630 is operable to display the screens and pages depicted in FIGS. 8-12 and the like.

The memory 620 stores computer executable instructions that when executed by the CPU 610 cause the CPU 610 to generate the screens and interfaces described above and displayed by the display device 630. Referring to FIG. 1, the memory 620 (see FIG. 15) also stores computer executable instructions that when executed by the CPU 610 implement the text application 116 and the web browser 118. Such instructions may be stored on one or more non-transitory computer-readable media. Returning to FIG. 15, other conventional components found in wireless communication devices, such as a USB interface, Bluetooth interface, camera/video device, infrared device, and the like, may also be included in the mobile communication device 600. For the sake of clarity, these conventional elements are not illustrated in the functional block diagram of FIG. 15.

The mobile communication device 600 also includes a network transmitter 650 such as may be used by the mobile communication device 600 for normal network wireless communication with the network(s) 120 (see FIG. 1), such as with a base station (not shown) of a cellular network. FIG. 15 also illustrates a network receiver 660 that operates in conjunction with the network transmitter 650 to communicate with the network(s) 120 (see FIG. 1), such as with the base station (not shown) of the cellular network. In a typical embodiment, the network transmitter 650 and the network receiver 660 are implemented as a network transceiver 670. The network transceiver 670 is connected to an antenna 680. Operation of the network transceiver 670 and the antenna 680 for communication with the network(s) 120 (see FIG. 1) is well-known in the art and need not be described in greater detail herein.

The various components illustrated in FIG. 15 are coupled together by a bus system 690. The bus system 690 may include an address bus, data bus, power bus, control bus, and the like. For the sake of convenience, the various busses in FIG. 15 are illustrated as the bus system 690.

The memory 620 may store instructions executable by the CPU 610. The instructions may implement portions of the method 500 illustrated in FIG. 13. Such instructions may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A computer-implemented method, comprising:
   displaying a selectable user input, wherein the selectable user input is displayed through a display device implemented on a self-checkout (SCO) device, wherein the SCO device is in communication with an application processing system through a security gateway over a communications network, and wherein the selectable user input corresponds to a credit application process completable through a mobile device;
   detecting user selection of the selectable user input;
   updating the display device to provide information corresponding to the credit application process and a prompt for a telephone number associated with the mobile device;
   transmitting a credit request corresponding to the credit application process, wherein the credit request is transmitted over the communications network, wherein the credit request includes SCO information associated with the SCO device and the telephone number, and wherein when the credit request is received at the application processing system through the security gateway, the application processing system uses the telephone number to complete the credit application process through the mobile device and transmits a code corresponding to a line of credit;
   receiving the code, wherein the code is received through a scanner implemented on the SCO device, and wherein the code is provided through the mobile device; and
   transmitting a payment request corresponding to a transaction, wherein the payment request is transmitted through the communications network, wherein the payment request includes the code and transaction information corresponding to the transaction, and wherein when the payment request is received at the application processing system through the security gateway, the application processing system uses the code and the transaction information to apply the line of credit to the transaction.

2. The computer-implemented method of claim 1, wherein the code is a barcode.

3. The computer-implemented method of claim 1, wherein the code includes encrypted payment information, and wherein the encrypted payment information corresponds to a new credit amount provided as a result of completion of the credit application process.

4. The computer-implemented method of claim 1, further comprising:
   receiving the telephone number, wherein the telephone number is received through the display device; and
   updating the display device to provide a confirmation window, wherein the confirmation window includes another selectable user input that allows for use of the scanner to initiate the transaction.

5. The computer-implemented method of claim 1, wherein the credit request is implemented as a JSON packet transmitted to an exposed RESTful endpoint associated with the application processing system.

6. The computer-implemented method of claim 1, wherein the credit request is transmitted using a Uniform Resource Locator (URL) associated with the application processing system.

7. The computer-implemented method of claim 1, wherein the transaction corresponds to one or more items scanned using the scanner implemented on the SCO device.

8. A self-checkout (SCO) device in communication with an application processing system through a security gateway over a communications network, comprising:
   a display device;
   a scanner;
   one or more processors; and
   memory, storing thereon instructions that, as a result of being executed by the one or more processors, cause the SCO device to:
      display a selectable user input, wherein the selectable user input is displayed through the display device, and wherein the selectable user input corresponds to a credit application process completable through a mobile device;
      detect user selection of the selectable user input;
      update the display device to provide information corresponding to the credit application process and a prompt for a telephone number associated with the mobile device;
      transmit a credit request corresponding to the credit application process, wherein the credit request is transmitted over the communications network, wherein the credit request includes SCO information associated with the SCO device and the telephone number, and wherein when the credit request is received at the application processing system through the security gateway, the application processing system uses the telephone number to complete the credit application process through the mobile device and transmits a code corresponding to a line of credit;
      receive the code, wherein the code is received through a scanner implemented on the SCO device, and wherein the code is provided through the mobile device; and
      transmit a payment request corresponding to a transaction, wherein the payment request is transmitted through the communications network, wherein the payment request includes the code and transaction information corresponding to the transaction, and wherein when the payment request is received at the application processing system through the security gateway, the application processing system uses the code and the transaction information to apply the line of credit to the transaction.

9. The SCO device of claim 8, wherein the code is a barcode.

10. The SCO device of claim 8, wherein the code includes encrypted payment information, and wherein the encrypted payment information corresponds to a new credit amount provided as a result of completion of the credit application process.

11. The SCO device of claim 8, wherein the instructions further cause the SCO device to:
receive the telephone number, wherein the telephone number is received through the display device; and
update the display device to provide a confirmation window, wherein the confirmation window includes another selectable user input that allows for use of the scanner to initiate the transaction.

12. The SCO device of claim 8, wherein the credit request is implemented as a JSON packet transmitted to an exposed RESTful endpoint associated with the application processing system.

13. The SCO device of claim 8, wherein the credit request is transmitted using a Uniform Resource Locator (URL) associated with the application processing system.

14. The SCO device of claim 8, wherein the transaction corresponds to one or more items scanned using the scanner.

15. A computer-program product tangibly embodied in a non-transitory machine-readable storage medium, including instructions configured to cause a self-checkout (SCO) device in communication with an application processing system through a security gateway over a communications network to perform operations including:
displaying a selectable user input, wherein the selectable user input is displayed through a display device implemented on the self-checkout (SCO) device, and wherein the selectable user input corresponds to a credit application process completable through a mobile device;
detecting user selection of the selectable user input;
updating the display device to provide information corresponding to the credit application process and a prompt for a telephone number associated with the mobile device;
transmitting a credit request corresponding to the credit application process, wherein the credit request is transmitted over the communications network, wherein the credit request includes SCO information associated with the SCO device and the telephone number, and wherein when the credit request is received at the application processing system through the security gateway, the application processing system uses the telephone number to complete the credit application process through the mobile device and transmits a code corresponding to a line of credit;
receiving the code, wherein the code is received through a scanner implemented on the SCO device, and wherein the code is provided through the mobile device; and
transmitting a payment request corresponding to a transaction, wherein the payment request is transmitted through the communications network, wherein the payment request includes the code and transaction information corresponding to the transaction, and wherein when the payment request is received at the application processing system through the security gateway, the application processing system uses the code and the transaction information to apply the line of credit to the transaction.

16. The computer-program product of claim 15, wherein the code is a barcode.

17. The computer-program product of claim 15, wherein the code includes encrypted payment information, and wherein the encrypted payment information corresponds to a new credit amount provided as a result of completion of the credit application process.

18. The computer-program product of claim 15, wherein the instructions further cause the SCO device to perform additional operations including:
receiving the telephone number, wherein the telephone number is received through the display device; and
updating the display device to provide a confirmation window, wherein the confirmation window includes another selectable user input that allows for use of the scanner to initiate the transaction.

19. The computer-program product of claim 15, wherein the credit request is implemented as a JSON packet transmitted to an exposed RESTful endpoint associated with the application processing system.

20. The computer-program product of claim 15, wherein the credit request is transmitted using a Uniform Resource Locator (URL) associated with the application processing system.

21. The computer-program product of claim 15, wherein the transaction corresponds to one or more items scanned using the scanner implemented on the SCO device.

* * * * *